US007728292B2

(12) United States Patent
Jolliffe et al.

(10) Patent No.: US 7,728,292 B2
(45) Date of Patent: Jun. 1, 2010

(54) METHOD AND APPARATUS FOR DETECTING POSITIVELY CHARGED AND NEGATIVELY CHARGED IONIZED PARTICLES

(75) Inventors: Charles Jolliffe, Schomberg (CA); Lisa Cousins, Woodbridge (CA); Gholamreza Javahery, Kettleby (CA)

(73) Assignee: Ionics Mass Spectrometry Group Inc., Concord (CA)

( * ) Notice: Subject to any disclaimer, the term of this patent is extended or adjusted under 35 U.S.C. 154(b) by 527 days.

(21) Appl. No.: 11/467,720

(22) Filed: Aug. 28, 2006

(65) Prior Publication Data

US 2008/0073530 A1 Mar. 27, 2008

(51) Int. Cl.
*G01N 23/00* (2006.01)
*G21K 7/00* (2006.01)

(52) U.S. Cl. .................. 250/307; 250/310; 250/396 R; 250/397; 250/288; 250/251; 250/309; 250/492.21; 250/492.3; 250/283; 250/287; 250/281; 250/306; 250/494.1; 250/292; 250/370.09; 250/305; 250/286; 313/527; 313/542; 313/541; 313/528; 313/103 CM; 313/105 CM; 313/104; 313/103 R; 313/105 R

(58) Field of Classification Search ................. 250/307, 250/310, 396 R, 397, 288, 251, 309, 492.21, 250/492.3, 283, 287, 281, 306, 494.1, 292, 250/370.09, 363.03, 305, 286; 313/527, 313/542, 541, 528, 103 CM, 105 CM, 104, 313/103 R, 105 R
See application file for complete search history.

(56) References Cited

U.S. PATENT DOCUMENTS 4,423,324 A * 12/1983 Stafford ...................... 250/281
4,896,035 A 1/1990 Mahoney et al.
4,988,867 A * 1/1991 Laprade ...................... 250/281

FOREIGN PATENT DOCUMENTS

JP 10154483 6/1998

OTHER PUBLICATIONS

Search Report for International Application No. PCT/CA2007/001493, filed Aug. 27, 2007.

* cited by examiner

*Primary Examiner*—Nikita Wells
*Assistant Examiner*—Meenakshi S Sahu

(57) ABSTRACT

An ion detector includes collision surfaces for converting both positively and negatively charged ions into emitted secondary electrons. Secondary electrons may be detected using an electron detector, than may, for example include an electron multiplier. Conveniently, secondary electrons (or electrons emitted by the multiplier) may be detected using an electron pulse counter.

31 Claims, 4 Drawing Sheets

METHOD AND APPARATUS FOR DETECTING POSITIVELY CHARGED AND NEGATIVELY CHARGED IONIZED PARTICLES

FIELD OF THE INVENTION

The present invention relates generally to ion detection, and more particularly to a method and device for detecting positively charged ionized particles, as well as negatively charged ionized particles.

BACKGROUND OF THE INVENTION

Mass spectrometry has proven to be an effective analytical technique for identifying unknown compounds and for determining the precise mass of known compounds. Advantageously, compounds can be detected or analysed in minute quantities allowing compounds to be identified at very low concentrations in chemically complex mixtures. Not surprisingly, mass spectrometry has found practical application in medicine, pharmacology, food sciences, semi-conductor manufacturing, environmental sciences, security, and many other fields.

A typical mass spectrometer includes an ion source that ionizes particles of interest. The ions are passed to an analyser region, where they are separated according to their mass (m)-to-charge (z) ratios (m/z). The separated ions are detected at a detector. A signal from the detector may be sent to a computing or similar device where the m/z ratios may be stored together with their relative abundance for presentation in the format of a m/z spectrum.

Typical ion sources are detailed in "Ionization Methods in Organic Mass Spectrometry", Alison E. Ashcroft, The Royal Society of Chemistry, UK, 1997; and the references cited therein. Conventional ion sources may create ions by atmospheric pressure chemical ionisation (APCI); chemical ionisation (CI); electron impact (EI); electrospray ionisation (ESI); fast atom bombardment (FAB); field desorption/field ionisation (FD/FI); matrix assisted laser desorption ionisation (MALDI); or thermospray ionization (TSP).

Ionized particles may be separated by quadrupoles, time-of-flight (TOF) analysers, magnetic sectors, and Fourier transform and quadrupole ion traps. Most ion sources are capable of producing ionized particles of positive or negative in polarity. For example, ESI transfers ions that are created in an acidic or basic solution directly into the gas phase. These ions are typically products of acid base reactions, such as protonated molecular adducts that tend to have basic sites, or negatively charged ions that are slightly acidic. APCI creates negative or positive ions in the gas phase, through chemical reactions.

The ion detector in a mass spectrometer typically amplifies the ion signal striking a detection surface in order to provide sufficient signal-to-noise to measure intensity as a function of mass. Typical ion detectors include discrete electrodes with a resistive chain or a continuous channel with a resistive surface. Ions strike the first electrode, causing secondary electrons to be emitted from the surface and undergo a cascade of amplification as they are accelerated down the tube. The electron acceleration potential is the difference between the voltage on the first electrode and the last electrode.

The emission of secondary electrons is velocity dependent, with higher velocity ions producing more emission. Ions of different mass-to-charge ratios are accelerated to the same energy (for the same charge state), and since $E=1/2\ mv^2$ the velocities and therefore the detection efficiency is mass dependent.

Two common approaches to detection are used: pulse counting and analog current detection. In pulse counting detection, individual ion pulses are amplified, typically with a gain between $1\times10^6$ and $100\times10^6$, and detected as a current pulse. In analog current detection, the individual ion pulses are amplified with a gain between 1,000 and 10,000 and measured as a DC current.

In some applications such as pharmaceutical drug discovery and drug development, it is desirable to investigate both positive and negative ions generated by one or more ion sources at approximately the same time. Therefore the mass analyser and ion detector must be able to rapidly switch from a mode that samples one polarity (e.g. negative ions) to another (e.g. positive ions).

Such switching typically requires reversal of polarity of large applied voltages. To do so, a power supply having a high voltage range that is capable of quick switching is required. Moreover, extreme care must be taken to limit the noise resulting from power supply switching, and to ensure the output signal is not distorted, and that the detector is not damaged. Typically, providing a suitable supply and integrating it in an ion detector is costly, and complex.

At least one ion detector that may be used to simultaneously detect both positively and negatively charged ions uses two conversion electrodes (also referred to as dynodes). Incoming positive ions strike one conversion electrode, held at high negative voltage, causing ejection of electrons. Incoming negative ions are attracted to, and strike the second conversion electrode, held at high positive voltage, causing ejection of a positive ion. Positive ions, and electrons emitted by the conversion electrodes are attracted to, and strike the inlet of a glass or similar electron multiplier, that is kept at a voltage above that of the conversion electrodes. Incident ions and electrons cause the emission of electrons, within the multiplier. Measurement of emitted electrons and associated energies allows for detection of ions incident on the conversion electrodes.

By design, emitted electrons are detected at ground potential, and may thus be detected by an analog detector. Not surprisingly, conversion of ions to electrons at electrodes is dependent on the mass of the ions. Unfortunately, conversion of negative to positive ions at a conversion electrode is not well understood and may exhibit poor sensitivity for certain compounds. Thus, negative ion detection in such a detector is mass and compound dependent.

Further, as positive ions are heavier than electrons, the electrons are accelerated more quickly to the multiplier, than positive ions. The relatively slow speed of the positive ion can impede high speed operation of the detector.

Accordingly, there is a need for an improved ion detector, and method capable of quickly and efficiently detecting both positively and negatively charged ionized particles.

SUMMARY OF THE INVENTION

In accordance with an aspect of the present invention, an ion detector includes collision surfaces for converting both positively and negatively charged ions into electrons. The collision surfaces may be formed as conversion electrodes. Emitted secondary electrons may be detected using an electron detector that may, for example, include an electron multiplier. Conveniently, secondary electrons (or electrons emitted by the multiplier) may be detected using an electron pulse counter.

In accordance with an embodiment of the present invention, a method of detecting charged particles, comprises guiding the charged particles toward first and second electrodes; biasing the first and second electrodes, at potentials with the first electrode biased to attract positive ones of the charged particles, and the second electrode biased to attract negatively charged ones of the charged particles. Secondary electrons are emitted by the first and second electrodes. The secondary electrons are attracted to an electron multiplier, and cause the electron multiplier to emit electrons. Electrons emitted by the electron multiplier, are detected at a detection surface biased at a potential above the first and second electrodes, to detect the electrons emitted by the electron multiplier, and thereby the charged particles.

In accordance with a further embodiment, an ion detector comprises first and second electrodes that emit secondary electrons when collided by a charged ion. An electron detector having a detection surface detects emitted secondary electrons. At least one voltage source biases the first electrode at a potential above ground, the second electrode at a potential below ground, and the detection surface of the detector at a potential above the first electrode.

In a further embodiment, a charged particle detector comprises first and second conversion electrodes that emit electrons when collided by charged particles. An electron multiplying detector multiplies the emitted electrons. The multiplying detector has a detection surface. At least one voltage source biases the first electrode at a potential above ground, the second electrode at a potential below ground, and the detection surface of the electron multiplier at a potential above the first and second electrodes.

In accordance with yet a further embodiment, a method of detecting charged particles, comprises guiding the charged particles toward first and second collision surfaces; biasing the first and second collision surfaces, at potentials with the first collision surface biased to attract positive ones of the charged particles, and the second collision surface biased to attract negatively charged ones of the charged particles; wherein the first and second collision surfaces each emit secondary electrons in response to collisions by ones of the charged particles; and detecting emission of the electrons by the collision surfaces to detect the charged particles.

In accordance with yet another embodiment, a method of detecting charged particles, comprises biasing first and second collision surfaces, at potentials with the first collision surface biased to attract positive ones of the charged particles, and the second collision surface biased to attract negatively charged ones of the charged particles; wherein the first and second collision surfaces each emit secondary electrons in response to collisions by ones of the charged particles; guiding charged particles of a single first polarity toward first and second collision surfaces; detecting emission of the electrons by the collision surfaces to detect the charged particles of the first polarity; after the detecting, guiding charged particles of a second, opposite, polarity toward first and second collision surfaces; detecting emission of the electrons by the collision surfaces to detect the charged particles of the second polarity.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
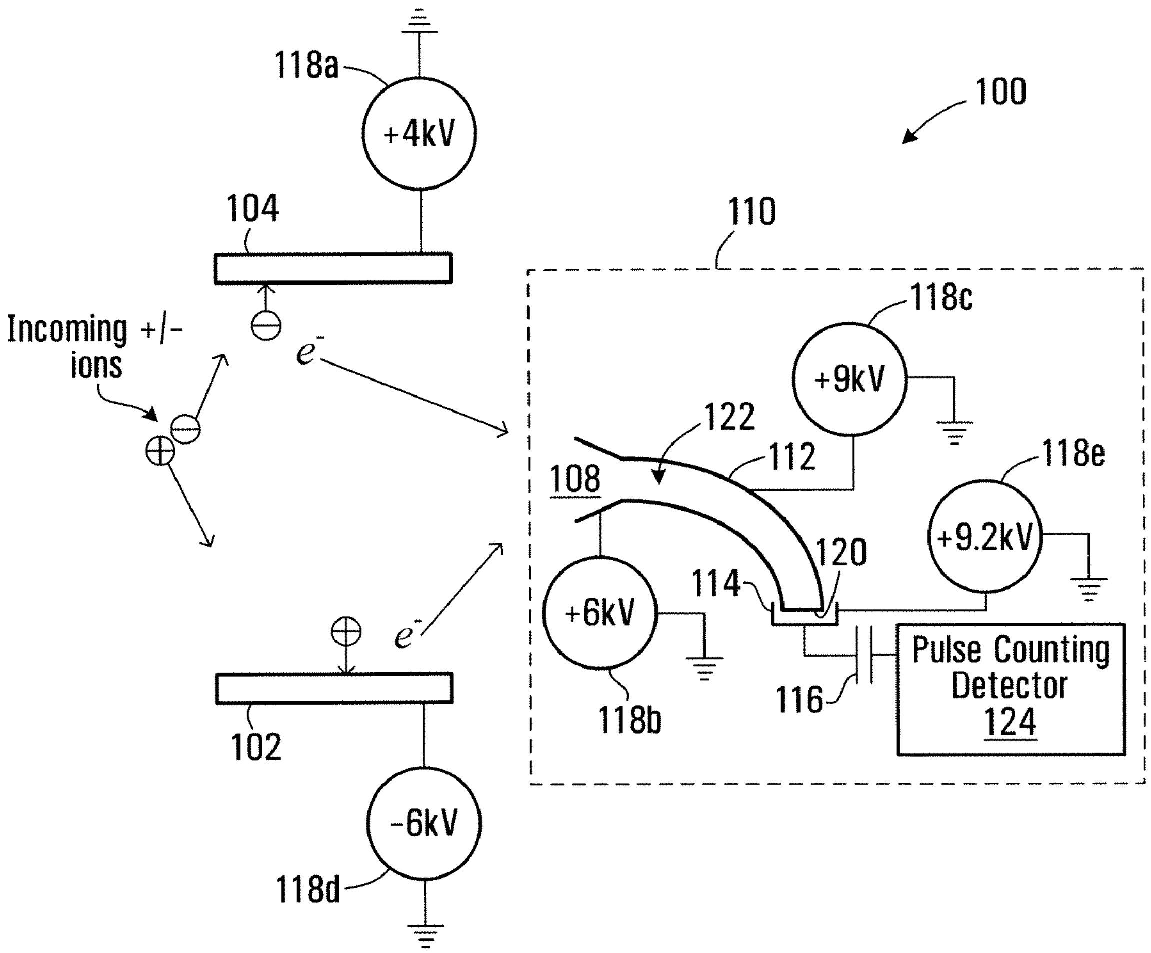
FIG. 1 is a schematic block diagram of an ion detector, exemplary of an embodiment of the present invention.

FIG. 1 schematically illustrates an ion detector 100, exemplary of an embodiment of the present invention. Ion detector 100 typically forms part of a mass spectrometer. Ions enter detector 100, from an upstream stage (typically referred to as a mass analyser) of the mass spectrometer. The mass analyser (not shown) may take the form of a sector, time of flight, quadrupole, quadrupole ion trap, fourier transform, orbitrap, or other mass analyser, known to those of ordinary skill.

As illustrated, ion detector 100 includes two conversion electrodes 102, 104. Conversion electrodes 102 and 104 provide collision surfaces that emit electrons in response to collisions by particles, such as molecules, ions, electrons and the like. The number of emitted electrons will be dependent on the energies of incident particles. Example conversion electrodes 102, 104 may, for example, be dynodes formed of metal or semi-conductor material. For example, conversion electrodes 102, 104 may be formed of stainless steel bars. Alternatively, conversion electrodes may be formed of alloys, or coated materials. Optional heating device may be in thermal communication with electrodes 102 and 104, to heat these to as suitable temperature to further facilitate the emission of electrons. A suitable temperature may, for example, be between 200° C. and 800° C.

An electron detector 110 is positioned downstream of conversion electrodes 102 and 104 that detects the emission of secondary electrons by electrodes 102 and 104. In the depicted embodiment, electron detector 110 includes an electron multiplier 112, having an inlet 108 and an outlet 120 connecting a channel 122 that provides electrons to a detection surface 114. Typically, a capacitor 116, transmits electron pulses emitted by electron multiplier 112 to a pulse counter, such as pulse amplifier/discriminator/counter 124. Capacitor 116 isolates the high voltage of detection surface 114 from the (usually) ground potential of the amplifier/discriminator/counter 124.

Of course, electron detector 110 could be embodied as any suitable electron detector. Electron detector 110 could, for example, accelerate the electrons (perhaps after several stages of amplification) into a photo-emissive detection surface which provides resulting photons into a photomultiplier or avalanche photodiode. Other suitable electron detectors will be apparent to those of ordinary skill.

In any event, detection surface 114 is typically a conductive or semi-conductive surface on which receives electrons to be detected. Surface 114 may, for example, be stainless steel.

Pulse amplifier/discriminator/counter 124 is an example of any suitable high sensitivity electron pulse counting apparatus. An example pulse amplifier/discriminator/counter 124 is available from ORTEC of Oak Ridge, Tenn., under model number Model Number 9302. Other suitable electron pulse counting devices will be apparent to those of ordinary skill.

Electron multiplier 112 may be a channel electron multiplier, and as such, channel 122 may be a ceramic channel, a semi-conductor channel, a glass channel, or the like. Again, the channel may be coated, with a material that facilitates emission of electrons. Alternatively, electron multiplier 112 may be a discrete dynode electron multiplier, a multi-channel plate multiplier, or any other suitable electron multiplier, known to those of ordinary skill.

Electric power supplies 118*a*, 118*d* apply DC voltages to the conversion electrodes 102 and 104, respectively. Similarly, supplies 118*b* and 118*c* apply front and rear potentials to regions proximate inlet 108 and outlet 120 of electron multiplier 112. Supply 118*e* provides a DC voltage to plate 114. Supplies 118*a*, 118*b*, 118*c*, 118*d* and 118*e* may be conventional DC supplies. Multiple ones of supplies 118*a*, 118*b*, 118*c*, 118*d* and 118*e* may be combined. For example, one or two physical DC power supplies and suitable resistor network may be used to provide voltages of supplies 118*a*, 118*b*, 118*c*, 118*d* and 118*e*.

In operation, positive and negative ions are sequentially produced by a suitable ion source upstream of detector 100. Ions (positive or negative) enter a region proximate conversion dynodes 102, 104. Positively charged ions are attracted to conversion electrode 102, at a negative voltage, and collide therewith. Conversion electrode 102 emits secondary electrons, at energies close to the voltage of power supply 118*d*. As the inlet 108 of electron multiplier is at a more positive potential than electrode 102, secondary electrons are accelerated to inlet 108 of electron multiplier 112.

Negative ions are similarly attracted by conversion electrode 104. Upon impact, these negative ions cause the emission of secondary electrons by conversion electrode 104. The secondary electrons, emitted by conversion electrode 104 are similarly attracted to inlet 108 of multiplier 112, which is also at a higher potential than conversion electrode 104.

Supplies 118*a* and 118*d* provide DC biases to attract incident ions. In the depicted embodiment, supplies 118*a* and 118*d* apply DC apply biases of +4 kV and −6 kV to conversion electrodes 104 and 102, respectively. Supply 118*b* applies a fixed voltage of +6 kV to inlet 108. As such, secondary electrons emitted by conversion electrodes 104 and 102 are respectively accelerated through potentials of 2 kV and 12 kV to inlet 108 of electron multiplier 112. Of course, other voltages could be applied to conversion electrodes 104, 102 and electron multiplier 112. For example, suitable voltages in the range of about +3 kV and +10 kV above the energies of ions to be detected, could be applied to conversion electrode 104. Similarly, voltages in the range of about −2 kV and −10 kV below the energies of ions to be detected could be applied to conversion electrode 102, depending upon the maximum mass detected. Corresponding voltages above that applied to conversion electrode 104 could be applied proximate the inlet 108 of electron multiplier 112. In the depicted embodiment, supplies 118*a*-118*e* provide the indicated voltages relative to ground. Of course, voltages would typically be provided relative to the potentials at which the ions are introduced into detector 100. For example, ions typically leave the upstream mass analyser at an elevated potential of, for example, between about 150V and −150V. Supplies 118*a*-118*e* may be biased accordingly, above the potential of the output of the mass analyser.

Power supply 118*c* applies a voltage higher than that proximate inlet 108. As such, secondary electrons, from both conversion electrode 102 and 104, at inlet 108, are accelerated to outlet 120 at a higher potential than inlet 108. The emission electrons, incident at inlet 108 further cause the emission of a cascade of tertiary electrons by electron multiplier 112 resulting in the electrons at output 120.

Electrons at outlet 120 are incident on detection surface 114. In order to attract electrons, detection surface 114 is maintained at a voltage higher than outlet 120. Surface 114 is maintained more positive than electrode 104 (e.g. at least +100V more positive than electrode 104, and in the depicted embodiment about +200V more positive than outlet 120), by supply 118*e*. Pulse detector 124, in turn, detects the output electrons. In the depicted embodiment, electron detector 110 takes the form of a pulse counting detector. As such, it may provide its output to a computing device (not shown), that in turn may tabulate counted pulses, and their masses and display measured results.

Conveniently, although the output of multiplier 112 and detection surface 114 are maintained at positive voltages, above ground, pulses may be easily detected by a pulse counting detector. Alternatively, current could be measured directly. However, high speed, sub-picoamp current detection at about the potential of outlet 120, is difficult and costly.

Conveniently, ion detector 100 allows for the detection of both positively charged and negatively charged ions. No switching of power supplies 118 is required and the sensitivity is not compromised.

Moreover, ion to electron conversion efficiencies of both conversion electrodes 102, 104 (and electron multiplier 112) are not dependent on the particular structure of incident molecules.

After ions of one polarity have been detected, ions of the opposite polarity may be introduced to detector 100, and detected.

As will be appreciated, applied voltages on electrodes 102, 104 and electron multiplier 112 (and surface 114) may be adjusted by a small amount in dependence on the polarity of ions to be detected, to aid in the formation, extraction and focusing of electrons, and remain within the scope of the invention. For example, for negative ions the voltage of electrode 104 may be made more positive by between 0 to 25% from the voltage applied for positive ions, and the voltage applied to electrode 102 may be made more negative by between 0 to 25%. For positive ions, the voltages applied to electrodes 102, 104 may again be respectively raised for electrode 104 and lowered for electrode 102.

In an alternate mode of operation, positive and negative ions may be detected concurrently by detector 100. For example, both positive and negative ions may be introduced to detector 100, as described above. Both types (i.e. positive and negative) may be detected as described above: they are attracted to one of conversion electrodes 102, 104 causing emission of secondary electrons that are attracted to and detected by electron detector 110. Discriminating detection of positive ions from negative ions may, however, not be possible as both positive and negative ions result in the detection of electrons at detection surface 114.

Figure 2:
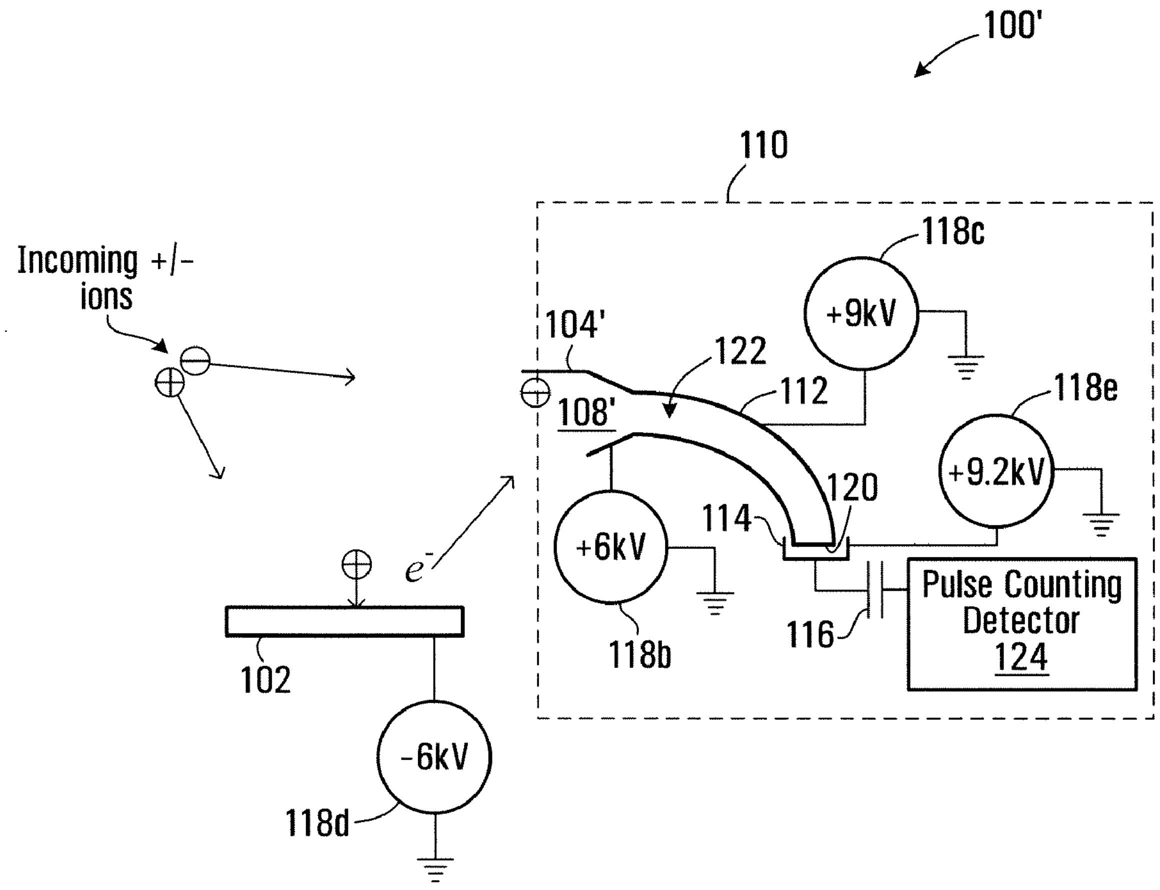
FIG. 2 is a schematic block diagram of an ion detector, exemplary of another embodiment of the present invention.

As will now be appreciated, conversion electrode 104 of detector 100 could actually be integrated with electron multiplier 112. In this way, detector 100 may be modified to form an alternate detector 100' depicted in FIG. 2. Unmodified elements of detector 100 forming detector 100' are identified using numerals identical used in FIG. 1. As illustrated in FIG. 2, inlet 108' of electron multiplier 112' acts as conversion electrode 104'. In operation, incident negatively charged ions would impact inlet 108' directly, causing emission of secondary (and tertiary electrons) within channel 122, as described above. Power supply 118*a* may be eliminated. Positively charged ions may be detected as in detector 100 (FIG. 1)

Figure 3:
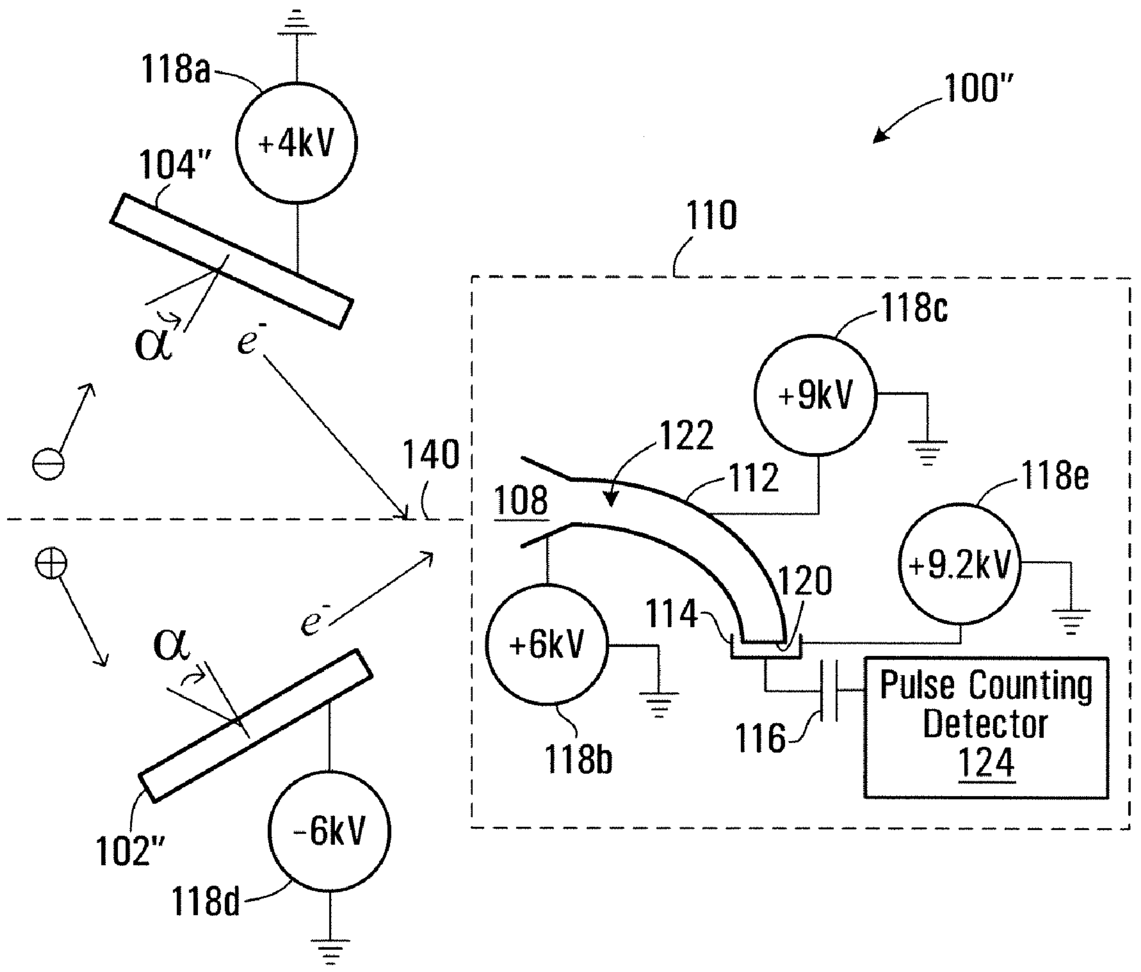
FIG. 3 is a schematic block diagram of an ion detector, exemplary of yet another embodiment of the present invention.

In further embodiments, an ion detector 100" illustrated in FIG. 3, may be formed with electrodes 102", 104" identical to electrodes 102, 104 but tilted, so that collision surfaces of electrodes 102" and 104" are at an angle α relative to an axis 140 parallel to the central axis approximately normal to a plane of inlet 108 of electron multiplier 112. In the depicted embodiment, the planes of the collision surfaces 102" and 104" are at an angle of between about 30° and 90° relative to axis 140.

Figure 4:
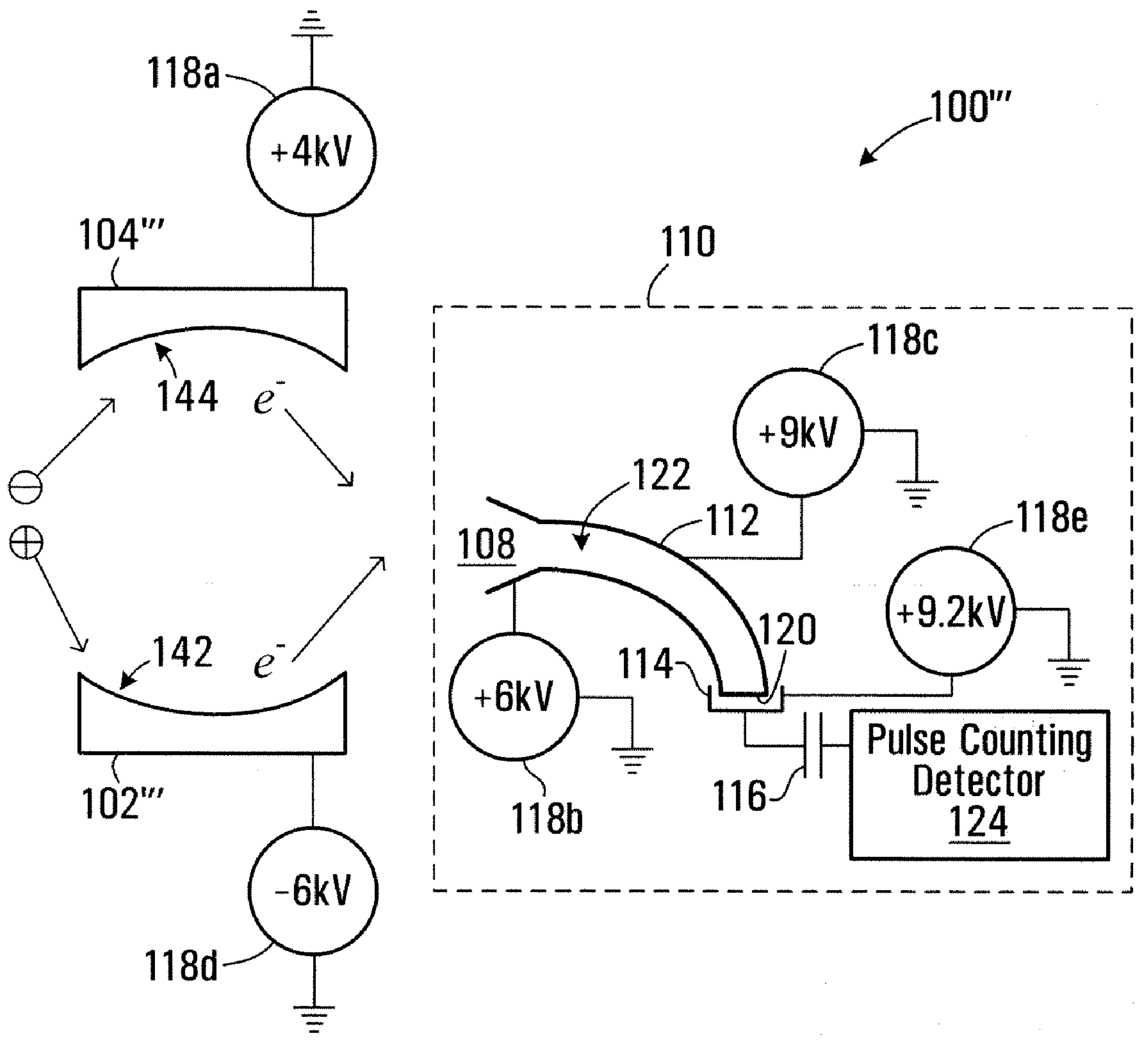
FIG. 4 is a schematic block diagram of an ion detector, exemplary of a further embodiment of the present invention.

In yet a further embodiment, an ion detector 100''' illustrated in FIG. 4, includes electrodes 102''', 104''' having non-planar collision surfaces 142 and 144, respectively. As illustrated, electrodes 102''', 104''' may have non-planar collision surfaces 142, 144 to aid in the formation, extraction and focusing of electrons including concave surfaces, as illustrated, or convex surfaces, ridged, or corrugated surfaces are possible. Again, detectors 102''' and 104''' may be formed of metal or semiconductor, or other suitable material.

Detectors 100', 100", and 100''' of FIGS. 2-4 may be operated to sequentially or concurrently to detect positive and negative ions, in much the same way as these may be detected using detector 100.

A person of ordinary skill will now appreciate that detectors 100, 100', 100", and 100''' may be used to detect particles other than ions. For example, positrons, or other charged particles could be detected.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of detecting charged particles, comprising
- guiding said charged particles toward first and second electrodes;
- biasing said first and second electrodes, at potentials with said first electrode biased to attract positive ones of said charged particles, and said second electrode biased to attract negatively charged ones of said charged particles;
- wherein said first and second electrodes each emit secondary electrons in response to collisions by ones of said charged particles;
- attracting said secondary electrons to an inlet of an electron multiplier, biased to attract secondary electrons from both said first and second electrodes and causing said electron multiplier to emit electrons in response thereto; and
- detecting said electrons emitted by said electron multiplier, at a detection surface biased at a potential above said first and second electrodes, to detect said electrons emitted by said electron multiplier, and thereby said charged particles.

2. The method of claim 1 wherein said biasing said second electrode comprises applying a bias voltage of between about +1 kV to +10 kV.

3. The method of claim 1 wherein said biasing said first electrode comprises applying a bias voltage of between about −1 kV to −10 kV.

4. The method of claim 1, wherein a voltage of about 0.1 kV and 1 kV are applied to said detection surface.

5. The method of claim 1, further comprising heating at least one of said first and second electrodes to a temperature between about 200° C. and 800° C.

6. An ion detector, comprising
- a first electrode that emits secondary electrons when collided by a negatively charged ion;
- a second electrode that emits secondary electrons when collided by a positively charged ion;
- an electron detector for detecting emitted secondary electrons, said electron detector comprising an electron multiplier having an inlet biased to attract said secondary electrons emitted by either of said first and second electrodes in response to collisions with negatively and positively charged ions, and a detection surface to detect said secondary electrons emitted by either said first and second electrode, and attracted by said inlet;
- and at least one voltage source to bias said first electrode at a potential above ground, said second electrode at a potential below ground, and said detection surface of said detector at a potential above said first electrode.

7. The ion detector of claim 6, wherein said electron multiplier emits tertiary electrons in response to said secondary electrons, and wherein said detection surface detects said tertiary electrons.

8. The ion detector of claim 6, wherein said first electrode is formed of one of metal and semi-conductor material.

9. The ion detector of claim 8, wherein said second electrode is formed of one of metal and semi-conductor material.

10. The detector of claim 6, wherein said first electrode is formed of stainless steel.

11. The ion detector of claim 6, wherein said electron detector comprises a channel electron multiplier.

12. The ion detector of claim 11, wherein said channel electron multiplier comprises a ceramic channel.

13. The ion detector of claim 11, wherein said electron multiplier comprises a glass channel.

14. The ion detector of claim 11, wherein said channel electron multiplier has an exit proximate said detection surface and wherein said channel electron multiplier proximate said inlet is biased at a lower potential than said channel electron multiplier proximate said exit.

15. The ion detector of claim 6, wherein said electron multiplier comprises a discrete dynode electron multiplier.

16. The ion detector of claim 6, wherein said detection surface comprises a photo-emissive surface.

17. The ion detector of claim 6, wherein said first electrode is biased at a voltage between about +1 kV to +10 kV.

18. The ion detector of claim 6, wherein said second electrode is biased at a voltage between about −1 kV to −10 kV.

19. The ion detector of claim 6, wherein said detection surface is biased at least 100 volts above said first electrode.

20. The detector of claim 6, wherein said electron multiplier comprises a multi-channel plate multiplier.

21. The ion detector of claim 7, wherein said first and second electrodes each comprise an emission surface, and wherein emission surfaces lie in a plane at an angle of between 45 and 60 degrees relative to an axis perpendicular to the plane of said inlet of said electron multiplier.

22. The ion detector of claim 7, wherein said first and second electrodes each comprise an emission surface, and wherein emission surfaces lie in a plane at an angle of between 30 and 90 degrees relative to an axis perpendicular to the plane of said inlet of said electron multiplier.

23. The ion detector of claim 6, wherein said first electrode forms part of said electron multiplier.

24. The ion detector of claim 23, wherein said first electrode forms part of said inlet of said electron multiplier.

25. The ion detector of claim 6, wherein said electron detector comprises a pulse counting detector.

26. The ion detector of claim 6, wherein each of said first and second electrodes comprise non-planar emission surfaces for emitting said secondary electrons, in response to collisions with said emission surfaces.

27. A charged particle detector, comprising
- a first conversion electrode that emits electrons when collided by a negatively charged particle;
- a second conversion electrode that emits electrons when collided by a positively charged particle;

an electron multiplying detector for multiplying said emitted electrons, said multiplying detector having a detection surface, said electron multiplying detector having an inlet; and at least one voltage source to bias said first electrode at a potential above ground, said second electrode at a potential below ground, said inlet to attract said electrons emitted by both said first and second conversion electrodes, and said detection surface of said electron multiplier at a potential above said first and second electrodes.

28. A method of detecting charged particles, comprising guiding said charged particles toward first and second collision surfaces;

biasing said first and second collision surfaces, at potentials with said first collision surface biased to attract positive ones of said charged particles, and said second collision surface biased to attract negatively charged ones of said charged particles;

wherein said first and second collision surfaces each emit secondary electrons in response to collisions by ones of said charged particles; and detecting emission of said electrons by said collision surfaces at an electron detector comprising an inlet biased to attract said secondary electrons emitted by both said first and second collision surface to detect said charged particles.

29. A method of detecting charged particles, comprising biasing first and second collision surfaces, at first potentials with said first collision surface biased to attract positive ones of said charged particles, and said second collision surface biased to attract negatively charged ones of said charged particles;

wherein said first and second collision surfaces each emit secondary electrons in response to collisions by ones of said charged particles; and guiding charged particles of a single first polarity toward first and second collision surfaces;

detecting emission of said electrons by said collision surfaces at an electron detector to detect said charged particles of said first polarity;

after said detecting, guiding charged particles of a second, opposite, polarity toward first and second collision surfaces;

detecting emission of said electrons by said collision surfaces at said electron detector to detect said charged particles of said second polarity wherein said electron detector comprises an inlet biased to attract said secondary electrons emitted by both said first and second collision surfaces.

30. The method of claim 29 further comprising biasing first and second collision surfaces, at second potentials respectively above and below said first fixed potentials, after said guiding said charged particles of a single first polarity, and before said guiding charged particles of a second, opposite, polarity.

31. An ion detector, comprising an electrode that emits secondary electrons when collided by positively charged ions;

an electron detector for detecting emitted secondary electrons and negative ions, said electron detector having a detection surface, and an inlet, said inlet configured to attract negative ions, and electrons emitted by said electrode; and at least one voltage source to bias said electrode at a potential below ground, said inlet at a potential above said electrode, and said detection surface of said detector at a potential above said inlet.

* * * * *